(12) United States Patent
Khmelev et al.

(10) Patent No.: US 12,069,554 B1
(45) Date of Patent: *Aug. 20, 2024

(54) FIRE WARNING NETWORK AND EMERGENCY GUIDANCE SYSTEM

(71) Applicant: UIPCO, LLC, San Antonio, TX (US)

(72) Inventors: Yevgeniy Viatcheslavovich Khmelev, San Antonio, TX (US); Christopher Russell, The Colony, TX (US); Gregory David Hansen, San Antonio, TX (US); Nathan Lee Post, Rockport, TX (US); Ashley Raine Philbrick, San Antonio, TX (US); Nolan Serrao, Plano, TX (US); Ruthie D. Lyle, Durham, NC (US); Pooja Krishnaswamy, McKinney, TX (US); Noemy Diosdado, Como, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,012

(22) Filed: Feb. 13, 2023

Related U.S. Application Data

(63) Continuation of application No. 17/334,022, filed on May 28, 2021, now Pat. No. 11,659,374.
(Continued)

(51) Int. Cl.
*H04W 4/33* (2018.01)
*G08B 17/103* (2006.01)
(Continued)

(52) U.S. Cl.
CPC ............ *H04W 4/90* (2018.02); *G08B 17/103* (2013.01); *H04W 4/024* (2018.02); *H04W 4/025* (2013.01);
(Continued)

(58) Field of Classification Search
CPC ..... H04W 4/024; H04W 4/025; H04W 4/029; H04W 4/06; H04W 4/12; H04W 4/33;
(Continued)

(56) References Cited

U.S. PATENT DOCUMENTS 6,317,042 B1 11/2001 Engelhorn
9,799,205 B2 10/2017 Wedig
(Continued)

OTHER PUBLICATIONS

Non-Final Office Action mailed Oct. 5, 2022 for U.S. Appl. No. 17/334,022.
Notice of Allowance mailed Jan. 19, 2023 for U.S. Appl. No. 17/334,022.

*Primary Examiner* — Jean A Gelin
(74) *Attorney, Agent, or Firm* — Plumsea Law Group, LLC

(57) ABSTRACT

A method and system of providing guidance and information to an end-user during an emergency situation. A network of one or more enrolled devices can obtain infrared data that will be used by the system to determine whether there is a high likelihood of a fire in a building. When an emergency situation such as a fire is detected, alerts can be generated at the enrolled devices that provide navigation cues based on user preferences and suggested evacuation routes to safely guide the end-user to the nearest designated exit.

20 Claims, 10 Drawing Sheets

Related U.S. Application Data

(60) Provisional application No. 63/033,146, filed on Jun. 1, 2020.

(51) Int. Cl.
*H04W 4/02* (2018.01)
*H04W 4/024* (2018.01)
*H04W 4/12* (2009.01)
*H04W 4/90* (2018.01)
*H04W 68/00* (2009.01)

(52) U.S. Cl.
CPC ............... *H04W 4/12* (2013.01); *H04W 4/33* (2018.02); *H04W 68/005* (2013.01)

(58) Field of Classification Search
CPC .......... H04W 4/70; H04W 4/80; H04W 4/90; H04W 68/005; H04W 12/104
See application file for complete search history.

(56) References Cited

U.S. PATENT DOCUMENTS

| | | | |
|---|---|---|---|
| 10,249,158 B1* | 4/2019 | Jordan, II | G08B 13/22 |
| 2011/0136463 A1* | 6/2011 | Ebdon | G01C 21/206 |
| | | | 455/404.1 |
| 2015/0081532 A1 | 3/2015 | Lewis | |
| 2016/0080921 A1* | 3/2016 | Yadav | H04W 4/023 |
| | | | 455/456.2 |
| 2017/0059343 A1* | 3/2017 | Spinelli | G01C 21/20 |
| 2017/0180046 A1 | 6/2017 | Stout | |
| 2020/0128646 A1* | 4/2020 | Sinha | H05B 1/028 |
| 2021/0012629 A1* | 1/2021 | Anderson | G01K 13/00 |
| 2021/0084445 A1* | 3/2021 | Sutherland | H04L 63/0884 |
| 2022/0141637 A1* | 5/2022 | Pellegrini | H04W 4/12 |
| | | | 455/404.1 |
| 2022/0270196 A1* | 8/2022 | Mathews | G06Q 50/265 |

\* cited by examiner

FIRE WARNING NETWORK AND EMERGENCY GUIDANCE SYSTEM

CROSS-REFERENCE TO RELATED APPLICATION

This application claims the benefit of U.S. Provisional Patent Application Ser. No. 63/033,146 filed on Jun. 1, 2020 and titled "Fire Warning Network and Emergency Guidance System", and U.S. patent application Ser. No. 17/334,022, filed on May 28, 2021 and titled "Fire Warning Network and Emergency Guidance System", the disclosures of which are incorporated by reference herein in their entirety.

TECHNICAL FIELD

The present disclosure generally relates to methods and systems for providing warnings of fire danger, and in particular to methods and systems for providing a network of users with real-time alerts and navigational directions during an emergency.

BACKGROUND

During unexpected or sudden emergencies, such as a fire, people nearby may be unaware of life-threatening conditions that require an evacuation of a particularly dangerous location and find a safer location. Such persons may not be given sufficient time or warning to make a safe exit possible. In addition, while many navigation and routing systems provide directions for vehicles or for people walking, existing systems are unable to guide persons who are indoors and require room-by-room guidance.

There is a need in the art for a system and method that addresses the shortcomings discussed above.

SUMMARY

In one aspect, a method for alerting and guiding end-users during an emergency situation is disclosed. The method includes activating a device network that includes at least a first device located in a first space that is in proximity to or within a physical structure, and receiving, from the first device, first data obtained during a first time by a first infrared sensor associated with the first device indicating a presence of one or more hotspots near the first device. The method also includes receiving, from the first device, first location data for the first device, and generating a first evacuation route from the first space to a first safe zone based at least in part on the received first data and first location data. Furthermore, the method includes causing the first device to present a first alert signal or message based at least in part on the first evacuation route.

In another aspect, a method for alerting and guiding end-users during an emergency situation is disclosed. The method includes receiving, from a first device of a device network, first data obtained during a first time by a first infrared sensor associated with the first device indicating a presence of one or more hotspots near the first device. The method also includes causing the first device to emit, as a first alert signal, a message informing the end-user about the emergency situation and directing the end-user of the first device toward a first safe zone.

In another aspect, a system for alerting and guiding end-users during an emergency situation is disclosed. The system includes a processor and machine-readable media including instructions which, when executed by the processor, cause the processor to activate a device network that includes at least a first device located in a first space that is in proximity to or within a physical structure, as well as receive, from the first device, first data obtained during a first time by a first infrared sensor associated with the first device indicating a presence of one or more hotspots near the first device. The instructions further cause the processor to receive, from the first device, first location data for the first device, and to generate a first evacuation route from the first space to a first safe zone based at least in part on the received first data and first location data. The instructions also cause the processor to cause the first device to present a first alert signal or message based at least in part on the first evacuation route.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Systems and methods for alerting a user who is in proximity of a fire and guiding said user through a low-visibility or otherwise dangerous environment to a safe location is disclosed. The system includes one or more smart devices and/or more Internet-of-Things (IOT) devices connected to a network. The device may be a smart phone carried by a user occupying a physical space, such as a house, apartment building, or other physical structure or edifice, or even an outdoor space. In some embodiments, the smart phone can include or have access to an infrared sensor that can receive sensed information and/or from other nearby devices such as a smoke detector. Based on the sensed information, pre-programmed location settings, and/or a triggering signal, the system can determine if there is a high likelihood of a fire and whether an evacuation is recommended. In response to such a determination, the system is configured to provide dynamic alerts and navigation instructions to a user to guide them to a safer location, away from potential danger. For example, if the system determines a high likelihood that some part of a house is on fire, a warning system may be activated. The system leverages its network and information about the location of each device to guide all users within a building or a particular "hazard range" through a room or series of rooms or spaces to the nearest exit, with the infrared sensor providing information that allows the users to avoid potential hotspots. In some examples, such guidance may be provided by text messages, in-app messages, voice instructions, sounds, or directions and/or maps displayed on the device.

Figure 1:
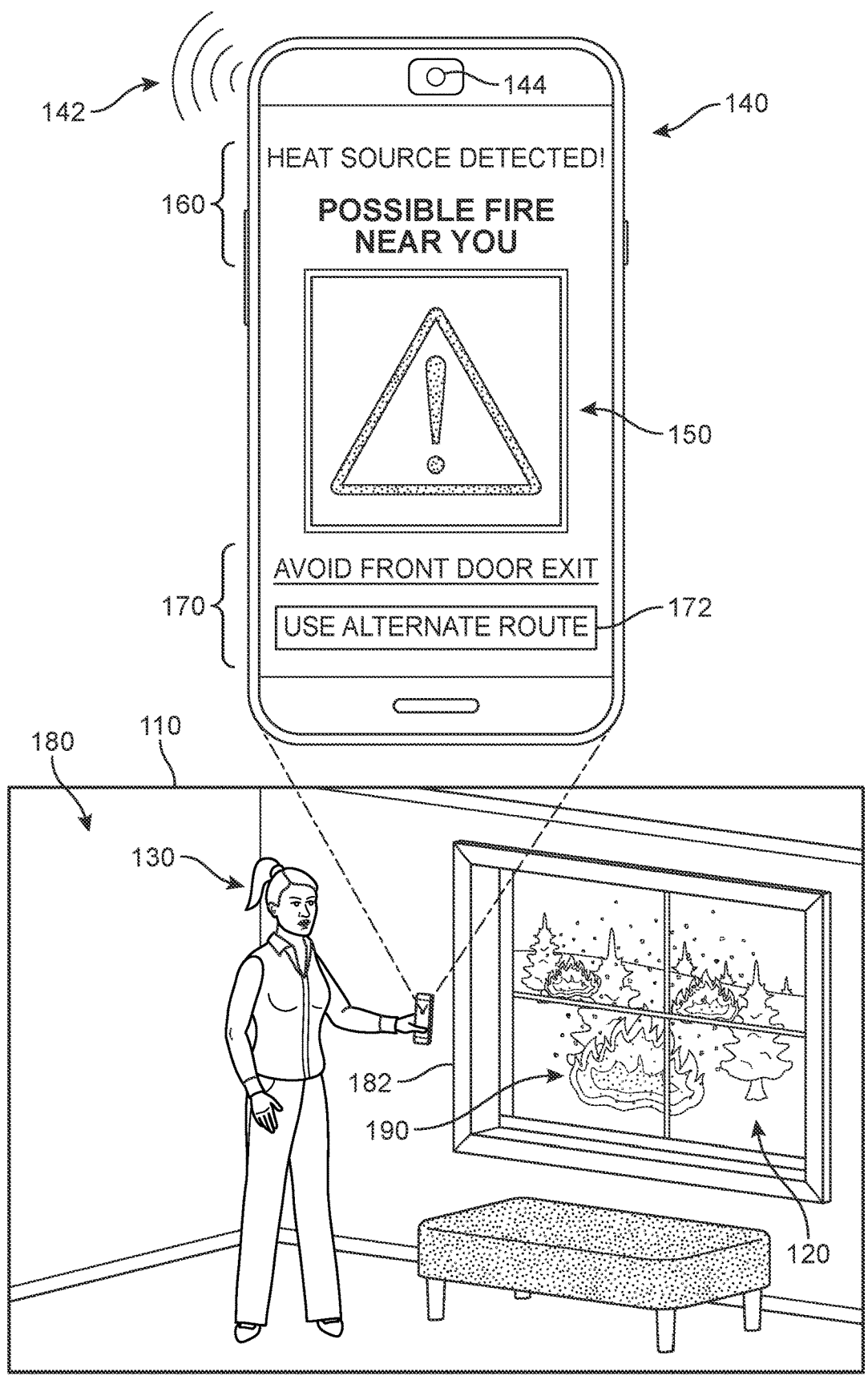
FIG. 1 is an overview of a fire detection system configured to provide alerts to an end-user during an emergency situation, according to an embodiment.

Referring now to FIG. 1, for purposes of introduction, a first person 130 is shown in a building 110, such as a home, office building, retail center, garage, mobile home, etc. It will be appreciated that the proposed system can also be integrated into an environment that does not include an entire structure, such as an apartment, condominium, or office space. The depicted building 110 can be understood to include a plurality of rooms, separated at least partly from each other by walls (i.e., interior walls and/or exterior walls).

An indoor space 180 in which the first person 130 is located currently is a large room with a window 182. However, the window 182 is being included for the reader's convenience, and need not be present during normal use of the proposed systems. The window 182 reveals an exterior scene of an outdoor space 120 where a fire 190 is now alight and growing. The first person 130 may not be aware of the fire 190 which, while nearby, is not directly observable or immediately perceptible within the building 110. However, an infrared sensor 144 of her mobile computing device (e.g., smart phone) 140 is configured to detect unexpected or sudden sources of heat and, in conjunction with an emergency application ("app") running on the smart phone 140, is able to determine that the detected heat source is a high source of danger. In response, the emergency app generates an alert 150 to the first person 130. The alert 150 includes a notice 160 ("Heat source detected! Possible fire near you") and a warning 170 ("Avoid door exit. Use alternate route") with a selectable option 172 provided within the message that, when triggered, can display or otherwise present recommended mapping or routes for a safe exit. In some embodiments, the alert 150 can also or alternatively include audio instructions 142 or other sound-based warning signal.

Furthermore, as will be discussed in greater detail below, in some embodiments, other persons in the house may also be alerted based on the initial detection by smart phone 140. Thus, a first device that is located at a first position and a second device that is located at a second position that is in another room (together comprising a "device network") can communicate with one another. Thus, the system can control and/or be coupled to devices outside of the actual building 110. In other words, multiple devices may be configured to receive and send data from/to a nearby client computing devices via a local or other network, and/or to a network providing internet connectivity. In different embodiments, one or more devices of the device network may include a computing system including one or more processors and memory. Memory may comprise a non-transitory computer readable medium. Instructions stored within memory may be executed by the one or more processors. The device computing system may be configured to receive and analyze data from various sensors associated with an internal sensor unit or data that is communicated from external sensors to the device. In different examples, the sensor unit includes one or more of a variety of sensors. The sensors can include an infrared (thermographic), thermal, or heat sensor, among others.

In other examples, the first person 130 may already realize there is a nearby fire and be searching for a safe exit. In such cases, the emergency app can be configured to continue to detect, in real-time, the location of possible fire sources as they occur or move through the building 110. In other words, the fire 190 may rapidly envelop areas beyond those initially recognized by the user, creating multiple hotspots around the user. The app can respond by receiving heat-based information from the local device, updating the first person 130 regarding the location of such hotspots, and offering alternative route options when possible.

References to various aspects of navigation and risk detection will be discussed throughout the following disclosure. As a general matter, "emergencies" can include natural disasters, such as wild fires, as well as man-made disasters such as house/building fires. It may be appreciated that the present embodiments could be utilized with any kind of emergency situation where a user needs guidance moving from one location to another under duress and in an expedited manner. In some cases, "detecting an emergency" may involve receiving information over a network that can be used to determine an emergency situation has arisen. For example, data shared from other local devices and sensors such as a smoke alarm, carbon monoxide detector, etc. can be used to trigger a warning and emergency navigation session. In other cases, the user may determine that an emergency is occurring and could manually start an emergency navigation session via their computing device.

As used herein, the term "safe zone" or "safe location" refers to a geographic area that has been identified as being safe (or safer) with a relatively high probability. For example, in a house fire, any location sufficiently far outside of the house might be considered a safe zone or safe location. The process shown in FIG. 1 describes using information from nearby devices to identify potential safe zones as well as potential danger zones. By knowing the locations of other devices in the device network that are near detected danger zones, a system can help a user avoid the danger zones. Alternatively, a system could convey information about the locations of any danger zones to another system or party that may be interested in that information. The devices that are enrolled in the proposed systems and are used to detect fires or generate alerts for a specific building or space can be referred to collectively as a local device network for that building.

In some embodiments, devices can include one or more sensors such as infrared detection sensors or other smart sensors. Infrared detection refers to the use of heat sensing equipment, also known as infrared (IR) scanners, cameras, imaging devices, or sensors, for detection of heat sources that may not be visually observable or otherwise detectable by a person. As a general matter, an infrared sensor may be configured to detect infrared radiation (e.g., infrared energy) from a target scene including, for example, mid-wave infrared wave bands (MWIR), long-wave infrared wave bands (LWIR), and/or other thermal imaging bands as may be desired in particular implementations. Other fire detection devices may include any number and type of sensors, such as smoke/fire/heat sensors, carbon monoxide/dioxide sensors, ambient light sensors, temperature sensors, humidity sensors, and the like, each of which may be configured to send messages to the other devices and/or a central server or cloud-computing system. Infrared detection offers advantages because it can readily provide a measurement of the temperature of the area being observed using equipment that is now readily available in many portable computing devices and/or can be easily integrated into existing personal computing devices.

In other cases, a sensor may include a microphone that can collect data to determine whether specific sounds in the house or building indicate an emergency situation, or sounds that are anomalous to the environment and may represent danger. For purposes of this application, the term ambient noise information is the sound profile collected for a particular location or space during normal, day-to-day use of such space. In some embodiments, current sound information is received by a sensor or other smart device, which identifies whether there is a variation in sound between the current sound information and the ambient noise information. The ambient noise information is subtracted from the current sound information if the variation has been identified, to identify a sound anomaly. The smart device extracts a sound anomaly signal and sends it to a database, where the sound anomaly signal is compared to predetermined anomaly signals stored in a database wherein the predetermined anomaly signals are associated with diagnostic information. In some other embodiments, a device or associated sensor can include features found on some smart devices. For example, a camera may be used to document optional factors, such as color and quality (density) of smoke or flames or the amount of light available.

Various terms related to fire and fire management may also be used in this description. For purposes of this application, a fire perimeter refers to an entire outer edge or boundary of a fire. A flare-up refers to any sudden acceleration of fire spread or intensification of a fire, and a hotspot refers to a particular active part of a fire. In addition, an incident refers to a human-caused or natural occurrence, such as wildland fire, that requires emergency service action to prevent or reduce the loss of life or damage to property or natural resources. Similarly, an incident action plan (IAP) refers to one or more pre-planned objectives reflecting the overall incident strategy and specific tactical actions and supporting information, including evacuation routes for a specific structure. The plan may be oral or written. When written, the plan may have a number of attachments, including: incident objectives, organization assignment list, division assignment, incident radio communication plan, medical plan, traffic plan, safety plan, and/or an incident map.

Figure 2:
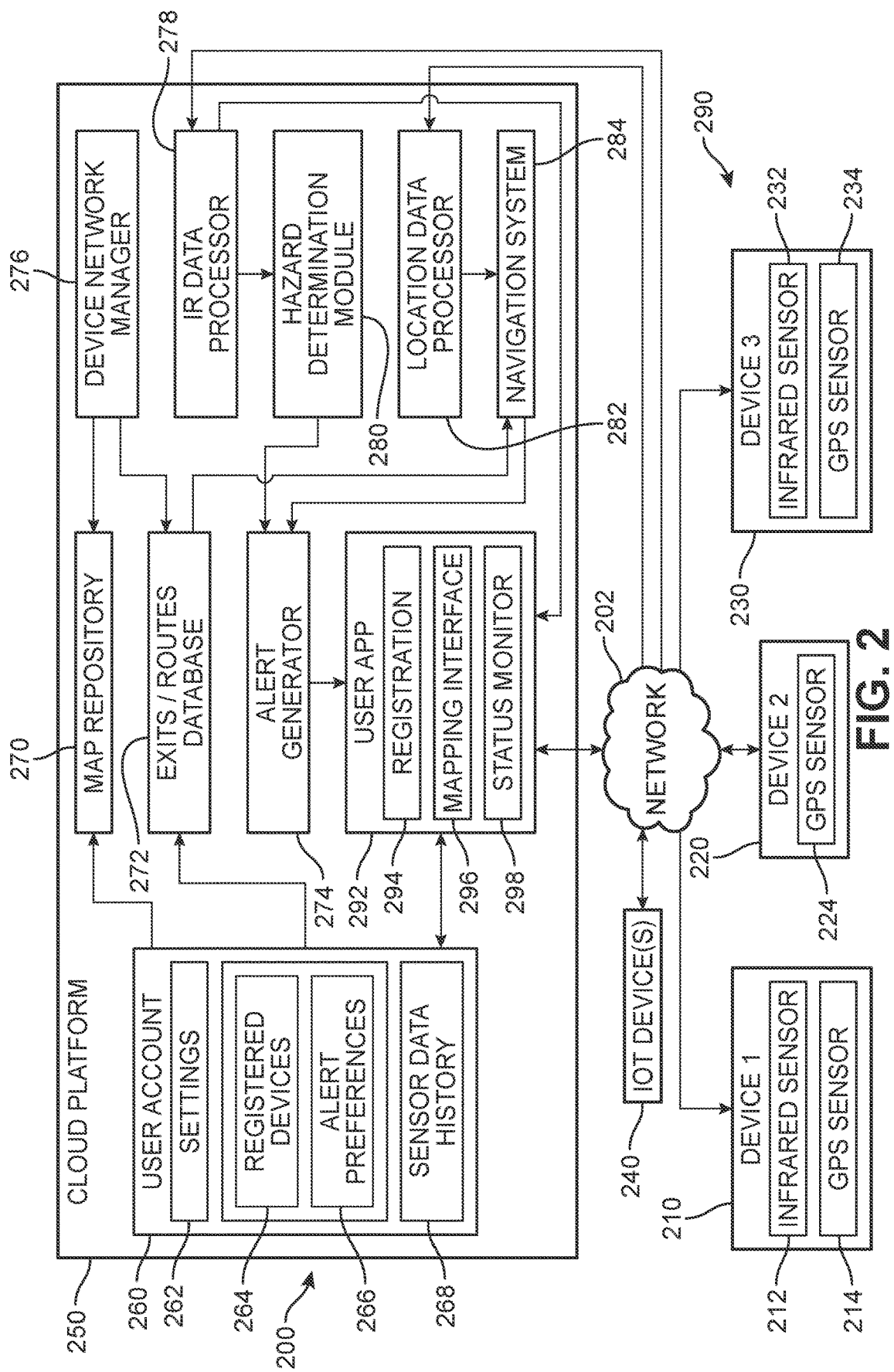
FIG. 2 is a schematic diagram of a fire detection system for providing alerts and navigation guidance to an end-user during an emergency situation, according to an embodiment.

In order to provide the reader with a greater appreciation of the embodiments, FIG. 2 depicts an overview of an embodiment of a fire alert and navigation system ("system") 200 in which one or more devices receive data from IR sensor(s). This data can be used by the system 200 to identify potential fire sources and present navigational to help guide a person to a safe position. The schematic view shows a device network 290 that can comprise one or more devices (here including a first device 210, a second device 220, and a third device 210) connected over one or more networks 212 to a cloud-based platform ("platform") 250. In different embodiments, networks 202 could include one or more Wide Area Networks (WANs), Wi-Fi networks, Bluetooth or other Personal Area Networks, cellular networks, as well as other kinds of networks. It may be appreciated that different devices could communicate using different networks and/or communication protocols. The devices can include computing or smart devices as well as more simple IoT devices configured with a communications module. The communication module may include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. In many cases, the communication module is a wireless connection; however, wired connections may also be used. For example, the communication module may include a wired serial bus such as a universal serial bus or a parallel bus, among other connections.

Furthermore, in some embodiments, the platform 250 and/or device network 290 may also be connected to one or more of a stationary internet of things (IoT) device(s) ("smart sensors") 240. Smart sensors 240 could comprise any of a variety of different IoT devices, such as one or more of a pressure sensor, chemical sensor (for detecting smoke, carbon monoxide or other chemical compositions), temperature sensor, magnetometer, smoke/flame detectors, moisture sensor, electrostatic sensor, volume/sound sensors, light sensors, aerosol characterization sensors, and other smart devices that may include one or more sensors. Supplemental data from smart sensors 240 can be received by the platform 250 and used to determine areas of danger and/or safety with more precision.

In addition, each device of device network 290 can include provisions for communicating with, and processing information from, platform 250 as well as other devices in device network 290. Each device may include one or more processors and memory. Memory may comprise a non-transitory computer readable medium. Instructions stored within memory may be executed by the one or more processors. In addition, each device may include a communication system such as a radio or other provisions for communicating using one or more communication methods. In particular, communication system includes provisions for communicating with other nearby devices and/or platform 250 over networks 202. For example, each communication system could include a Wi-Fi radio, a Bluetooth radio, and/or a cellular network radio.

In some embodiments, an end-user can interact with the proposed system, for example via a user application ("application") 292 provided via platform 250 over networks 202. In some embodiments, the application 292 can be downloaded to be accessible locally on the device. The application 292 can offer a device registration and profile interface ("interface") 294 for accessing and modifying settings in the device network and alert and navigation system. In some embodiments, the application 292 can be configured to connect a user's device (for example, via a WiFi or cellular connection) with an online service provider to add or modify information for the user (user account 260) stored in the cloud, including user settings 262, a listing 264 of devices registered with the system under this user account along with the user's desired alert preferences 266 (e.g., SMS messages, audio, visual, frequency, etc.) for each device and/or type of emergency situation. In some optional embodiments, the user account 260 can also include a sensor data repository 268 that can store data received from user devices for review by the user and/or as a baseline reference for the system when determining whether there is a potential danger.

In different embodiments, the application 292 can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

As discussed herein, the system can be configured to receive location data from each registered device. In FIG. 2, first device 210 includes a first GPS or other location sensor 214, second device 220 includes a second GPS sensor 224, and third device 230 includes a third GPS sensor that can each transmit in real-time or near-real-time the current location of the device. This data is received by a location data processor 282 and shared with a navigation system 284 of platform 250. Navigation system 284 may comprise any system capable of providing directions and/or other kinds of routing information between two or more locations. In some cases, navigation system 284 can provide directions in an outdoor environment. In other cases, navigation system 284 can provide directions in an indoor environment. In some cases, navigation system 284 may provide directions in both outdoor and indoor environments.

Furthermore, the system 200 can be configured to receive infrared-based data from each registered device with access to an infrared sensor. For example, in FIG. 2, first device 210 includes a first infrared sensor 212 and third device 230 includes a second infrared sensor 232 that can each transmit in real-time or near-real-time the infrared data obtained by the device. This data is received by an infrared data processor 278 and shared with a hazard determination module 280 of platform 250.

As will be illustrated in FIGS. 4-7, the system 200 is configured to provide users with the ability to monitor a target environment for indications of fire. For example, in some embodiments, the application 292 can be configured to cause a display of a mapping interface 296 on a device that receives information from navigation system 284 and can dynamically guide users to safe zones from their current location based on the detected hotspots. The application 292 can also offer users access to a status monitor dashboard 298 that may be used to track and view updates regarding danger and potential zones to avoid. In some embodiments, the platform 250 can make reference to and/or incorporate information from a map/layout repository 270 which can include automatically generated maps based on indoor positioning systems, user-uploaded maps, as well as maps obtained from municipal databases showing detailed schematic layouts of various buildings. These maps can be used, in conjunction with user feedback and preferences, to identify primary exits (e.g., doors) and secondary exits (e.g., windows) for a particular structure and potential routes to each of these exits from various locations in the structure, which can be stored in a pre-programmed exits/routes database 272. In some embodiments, an administrator for the building can monitor and adjust notification settings across all devices registered for alerts for the building, as well as update or otherwise indicate the building's preferred evacuation routes and exits.

In some embodiments, the infrared sensors for one or more devices can be used to detect infrared radiation emitted from the observed scene and captures said infrared radiation using an infrared sensor array of the infrared sensor. The infrared sensor can convert the incoming infrared radiation to an infrared radiation signal comprising infrared radiation data, which can be transmitted from the device to the IR data processor 278. In some embodiments, the IR data processor 278 can transform the data to a visible representation of image data in the form of an infrared image. The application 292 can then be optionally configured to present these images to an end-user, for example, via status monitor 286.

In different embodiments, an area in the observed real-world scene can be evaluated by the infrared sensor by applying a comparison of the detected infrared radiation values in the area to a mean value of the detected infrared radiation relating to surrounding areas. Changes in temperature in a target area that exceed a particular threshold can be referred to as a local environmental change. Generally, when an area with lower infrared radiation is detected (e.g. in the form of thermal values or temperatures) relative to the mean detected infrared radiation of surrounding areas, this can be referred to as the detection of a "cold spot". In contrast, when an area with higher infrared radiation is detected (e.g. in the form of thermal values or temperatures) relative to the mean detected infrared radiation of surrounding areas, this can be referred to as the detection of a "hot spot" which may indicate for instance that the area comprises overheated components and has an increased risk of catching fire.

In embodiments in which a visual representation of the data is provided, a color scale representing the radiation of the observed real-world scene ranging from blue for low temperatures to red for high temperatures may be used. In other embodiments, any color scale, gray scale, or other suitable visible representation may be used to represent the different infrared radiation levels detected. This process can allow the end-user to quickly recognize the hot and cold spots directly in the real-world scene that he or she is investigating, in alignment with the scene, even if the source of the low or high thermal or temperature values is disposed on the other side of a surface or wall relative to the infrared sensor.

In some embodiments, a controller of hazard determination module 280 may be programmed to request the end-user move the field of view of the infrared sensor as necessary to view multiple regions of the target environment that the platform 250 is designed to monitor. For example, the controller and/or sensor data history 268 (memory) may store data relating to temperatures from each of a number of distinct and/or spatially arranged locations within the target environment. This collected data may be compared and/or tracked over time, thereby permitting the hazard determination module 280 to recognize increasing temperatures that may indicate a growing fire.

Thus, in some embodiments, the hazard determination module 280 may be programmed to detect occurrences of temperature increases that exceed a particular threshold, and/or actual sensed temperatures that are above a particular threshold. For example, any measured temperature that exceeds 100° C. (or some other selected temperature) may trigger an alarm via alert generation module 274. For example, the alert generation module 274 can send a request to the application 292 to cause an alert message to be displayed at the user's device presenting the pertinent information or providing links to the information. In another example, the alert generation module 274 can send a message directly to the user's cellular number (text or phone) that presents the warning information more directly. In some other embodiments, the system can be configured to also or alternatively detect temperatures changes that exceed a particular threshold. As an example, the hazard determination module 280 may trigger an alert (i.e., via alert generation module 274) if any specific location increases in temperature more than 5-10° C., or some other preselected threshold temperature. As another example, the hazard determination module 280 can be configured to cause the generation of an alarm if the temperature for a specific location increases more than a particular magnitude (e.g., 20-25° C. or some other preselected temperature) over a preselected period of time (e.g., 10-30 seconds or some other period of time). These temperatures and time periods are only illustrative, and any suitable temperatures and time period may be used, as desired. In addition, in some embodiments, if the target environment is known or expected to include people or other regular sources of warmth, either intermittently or constantly, the thresholds at which an alarm may sound may be adjusted so that the infrared radiation emanating from the source will not set off alarms. The alerts can then be presented to the affected devices via application 292. Furthermore, in some embodiments, upon determining there is a potential fire, the platform 250 can activate some or all of the remaining devices linked to the device network for that building via device network manager 276, as well as any associated infrared sensors and IoT devices. The data collected can then be used to reevaluate the current situation in real-time and make changes to recommended evacuation routes and change the content of alert messages if necessary.

Figure 3A:
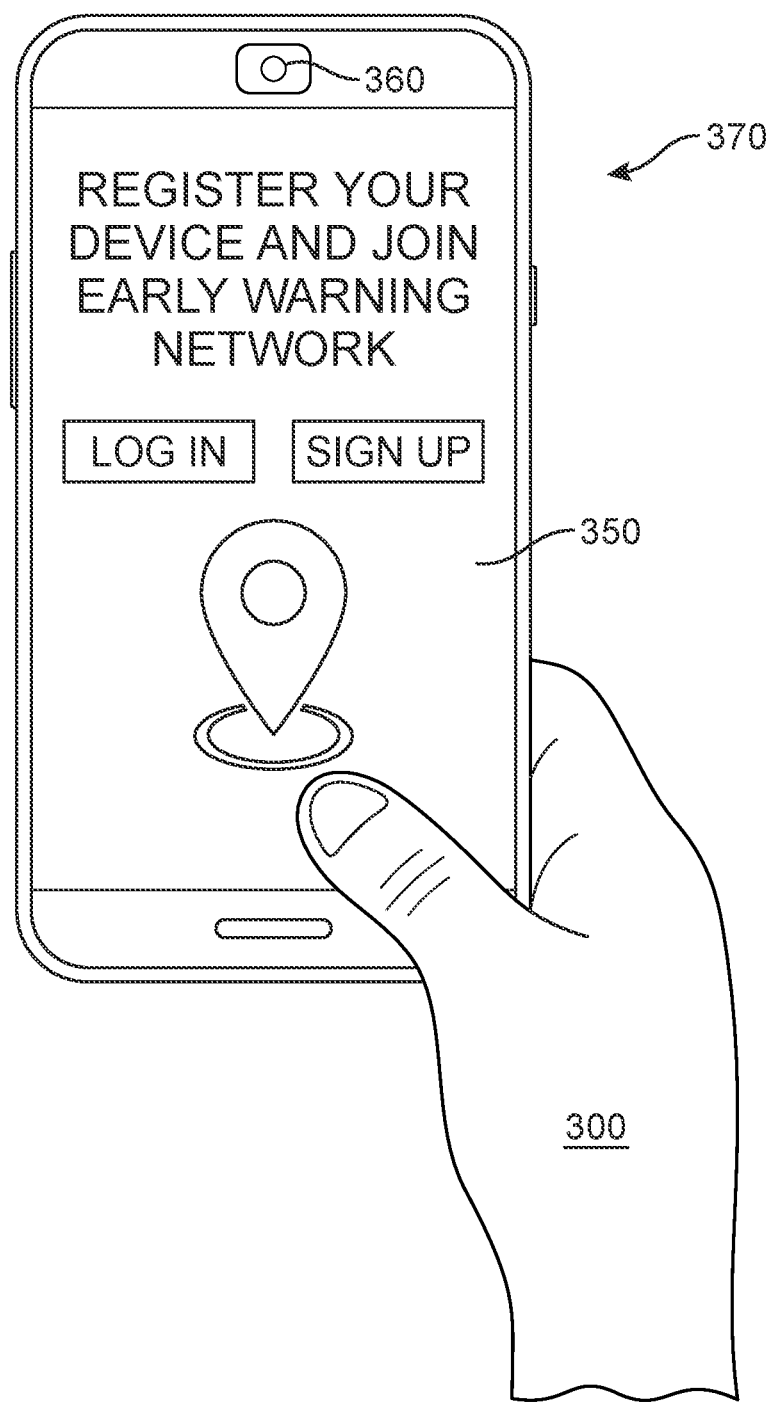
FIG. 3A is an illustration of an end-user enrolling a mobile device in a fire detection system, according to an embodiment.

Referring now to FIG. 3A, a first user 300 is depicted at a first time accessing a device registration application ("app") 350 on a mobile computing device 370. The user 330 is able to use app 350 to join a device network (if available) and consent to the app 350 using an infrared sensor 360 associated with device 370 to detect heat information. In some embodiments, the app 350 can also be used to access a user account, settings, preferences, options, and/or device(s) manager profile. For example, the app 350 may offer content via native controls provided by the interface. In some embodiments, the user interface can include a welcome or header message (e.g., "Register and map your device to its location"). In addition, one or more data input fields can also be presented.

Figure 3B:
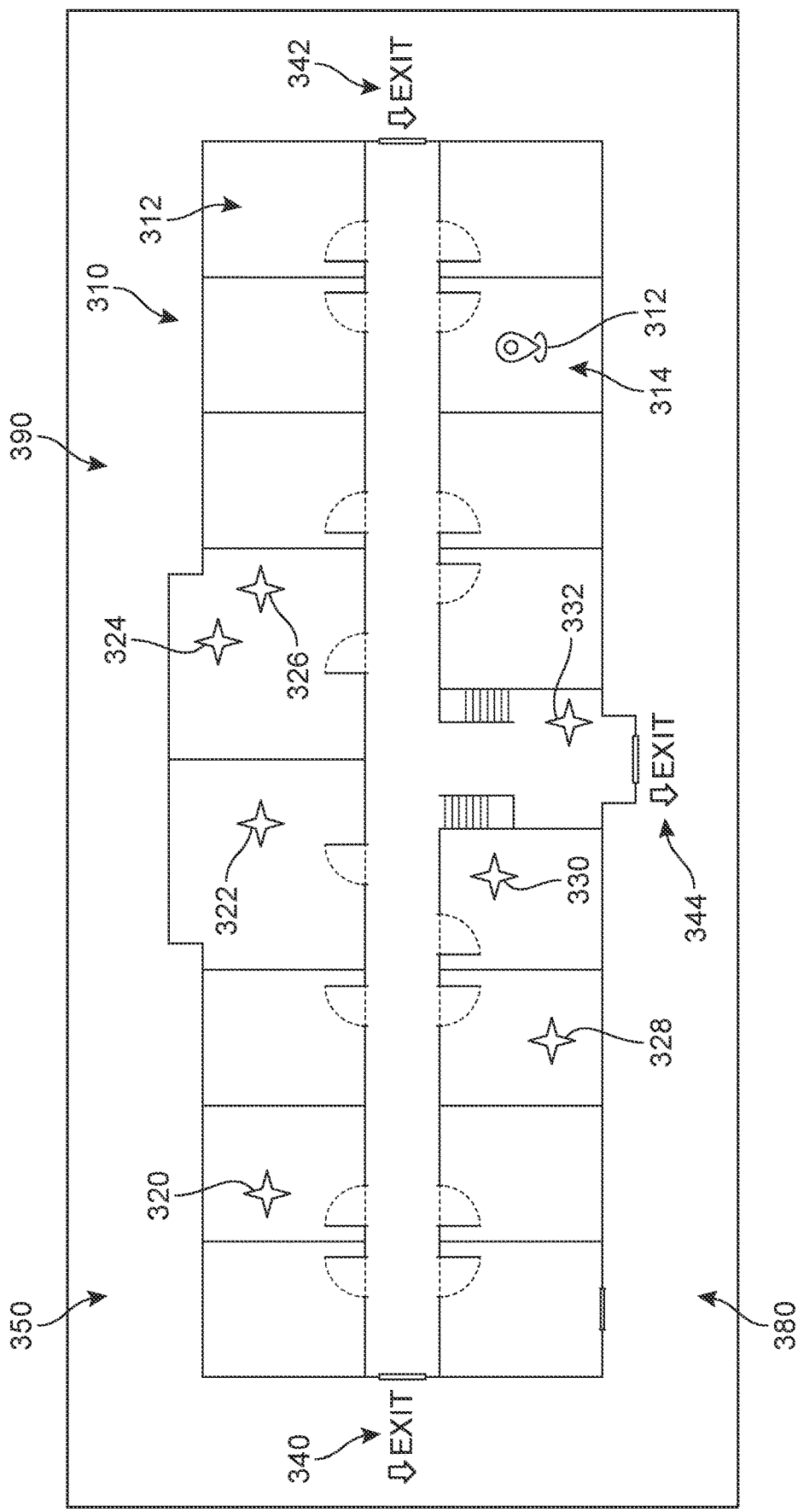
FIG. 3B is an illustration of a mapping interface of the fire detection system.

In some embodiments, the app 350 also offers an opportunity for the first user 300 to map the device within or to the specific physical space in which it is being integrated. For example, selection of a mapping option may open a new window or application feature whereby the user can input information describing the building as a whole and pre-programmed information that indicates the optimal exit routes from each room or space in the building. In FIG. 3B, one example of a mapping interface 310 is presented on a display 390 of a computing device. The mapping interface 310 presents a schematic layout of the current location within a building 380. This schematic may be automatically generated by the app 350 and/or inputted by the user. For example, a map can be submitted to the app 350 for incorporation into or reference by the device network. In some embodiments, a map of a building may be uploaded by the user or building management, and visually represent the building 380 that encompasses a plurality of rooms 312 including a first room 314 where the first user is currently located. In some optional embodiments, a GPS overlay is automatically shown to the user whereby all devices that are registered with the app 350 for that area or region and have consented to tracking are also shown. The locations of each of these devices are represented by a plurality of icons, indicating a first device 320, a second device 322, a third device 324, a fourth device 326, a fifth device 328, a sixth device 330, a seventh device 332, and user's own device 334. In different embodiments, the devices may be mapped via an indoor positioning system (IPS). For example, a user may open or launch mapping interface 310 that is configured to use IPS and/or other indoor localization techniques to create a map of the structure or portions thereof. In one embodiment, one or more of the devices may include an RFID tag or GPS signal to generate location information.

In some embodiments, the mapping interface 310 can also be configured to receive, from the user or from a building manager registered with the app 350 (i.e., an administrator for that specific building with special access rights to the app 350), one or more tags indicating where the building exits are. In this example, the building 380 can be seen to include a first exit 340, a second exit 342, and a third exit 344. In different embodiments, the user and/or building admin may be able to use the app 350 to also tag and identify one or more spaces shown in mapping interface 310, such as but not limited to "Kitchen", "Supply Room", "Reception", "Security", "Childcare", "Tech Support", "Jennifer Adams Office", "Meeting Room A", "Room 110", "Conference Room B", etc. to allow for simpler navigation instructions (see for example FIG. 8). In other embodiments, the user 300 can be provided with a drop-down or other list to select a room or room type (e.g., for a house, such options can include Living Room, Master Bedroom, Foyer, Bathroom, etc.).

Once the user has registered and submitted his or her consent for the app 350 to generate alerts via the app 350 and/or to send messages directly to his or her phone, as well as permission to access the infrared sensor and its data, and/or communicate its location, the app 350 can be configured to communicate the permitted information over a network to/from the designated device, for example over a personal area network (PAN), short-range wireless communication (e.g., Bluetooth®, NFC), a local area network (LAN), a cellular network, etc. In other embodiments, the app 350 can convey the information over a network to a server, which can update the user's online management account and device profile to include the location information for the selected device. In different embodiments, the location information may be stored locally by the device and/or remotely on a user's cloud management account. In some cases, the user can further assign a name to an individual device, assign multiple devices to a single group, assign or identify a room name, and many other functions. In addition, user interfaces for the app 350 can provide a plurality of selectable options, such as navigation options (e.g., "Back", "Save", "Next"), or additional menu options for accessing other features or aspects of the device or user profile. In some embodiments, this registration process can also be performed over the phone with a service representative.

It should be understood that the text, images, and specific application features shown in the figures are for purposes of illustration only and in no way limit the manner by which the application may communicate or receive information. In addition, in other embodiments, one or more options or other fields and text may appear differently and/or may be displayed or generated anywhere else on the screen(s) associated with the client's system, including spaced apart from, adjacent to, or around the user interface. In other words, the figures present only one possible layout of the interface, and do not in any way limit the presentation arrangement of any of the disclosed features.

Referring now to FIGS. 4-7, a sequence of drawings illustrates one example of a use of a fire alert and navigation system ("system"). It should be understood that while the drawings illustrate one example of a building environment within which one or more of the devices, methods, systems, services, and/or computer program products described further herein can be applicable, any other structure may implement said systems. The building environment depicted in FIGS. 4 and 5 includes a one-story structure 400 illustrated as a cutaway including at least two adjoining rooms, representing a portion of a house, office building, garage, townhome, mobile home, or other structure. It will be appreciated that the system can also be integrated into an environment that does not encompass the entire structure, such as an apartment, condominium, or office space. Furthermore, the system can control and/or be coupled to devices outside of the actual structure.

Figure 4:
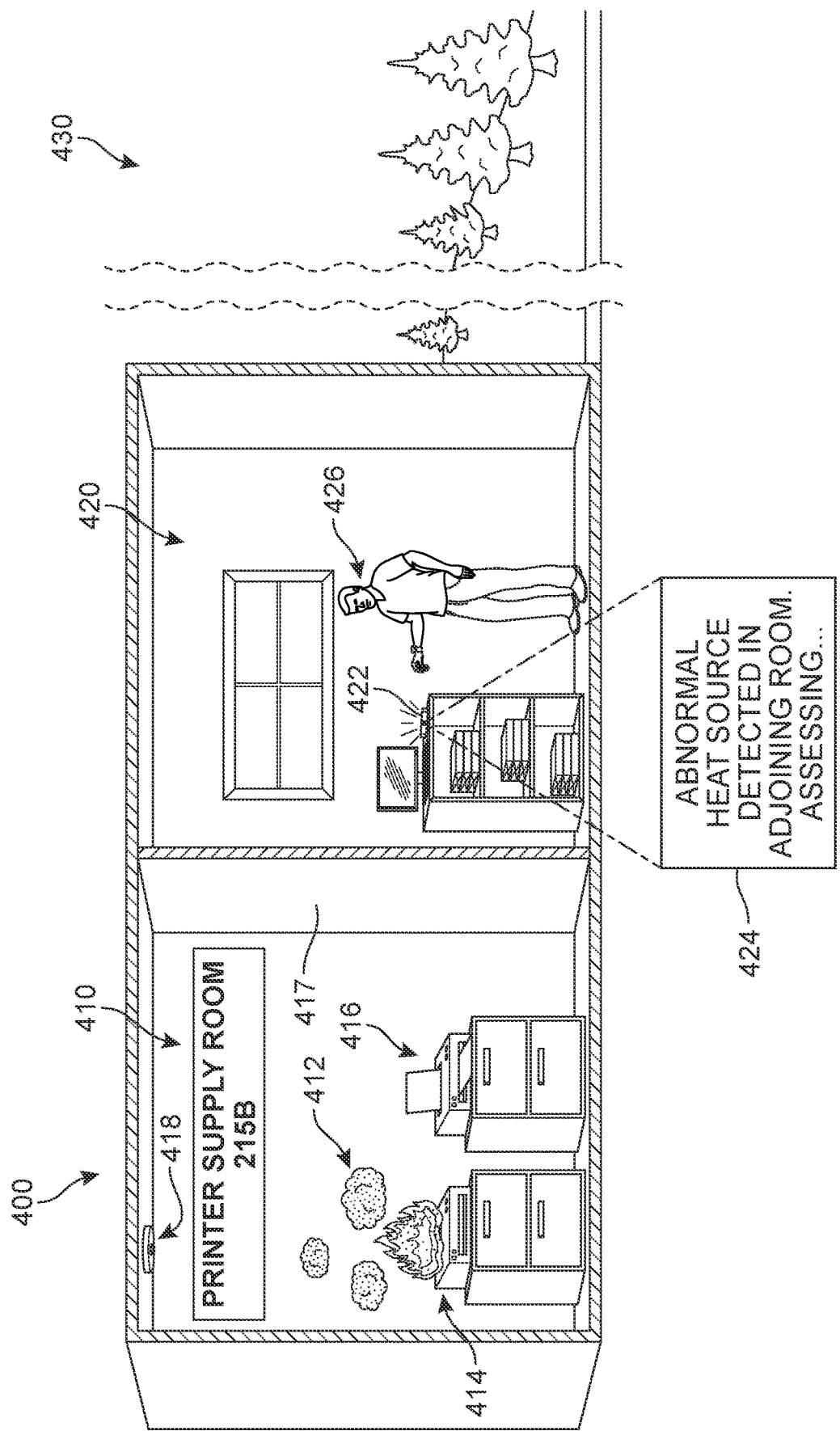
FIGS. 4 and 5 depict a sequence in which a fire is detected by a device and the system causes an alert to be generated at the enrolled devices, according to an embodiment.

In FIG. 4, the structure 400 includes a first room 410 (here labeled as "Printer Supply Room 215B") and a second room 420 next door to and sharing a wall 417 with first room 410. An outdoor environment 430 external to structure 400 is also observable. In this example, a set of printers (first printer 414 and second printer 416) are disposed in first room 410. At this time, a mechanical or electrical failure has caused the first printer 414 to overheat, leading to a fire 412. The heat emitted by the fire 412 continues to grow along with the fire itself. Meanwhile, a second user 426 occupying the office space of second room 420 receives a first alert message 424 ("Abnormal heat source detected in adjoining room. Assessing . . . ") via his mobile device (a first device 422) that had been previously registered with the system. The system can be configured to cause the alert to be displayed via a text or SMS message on the user's device, and/or via in-app messaging and pop-up windows. Thus, an infrared sensor of phone, operating with the system through first device 422, has detected an unexpected or otherwise potentially hazardous heat source. In some embodiments, the system can ask the user to orient the infrared sensor toward a particular direction to better evaluate the surrounding environment. In another embodiment, an IoT sensor 418 positioned in the first room 410 can also or alternatively trigger the system, and/or generate a request to nearby users to activate their devices. In other words, in different embodiments, in the event that an emergency situation is identified, network devices may receive sensed information from nearby smart devices such as a smoke detector, temperature detector, or other devices arranged throughout the structure, and determine that warnings and/or evacuation instructions are warranted.

Figure 5:
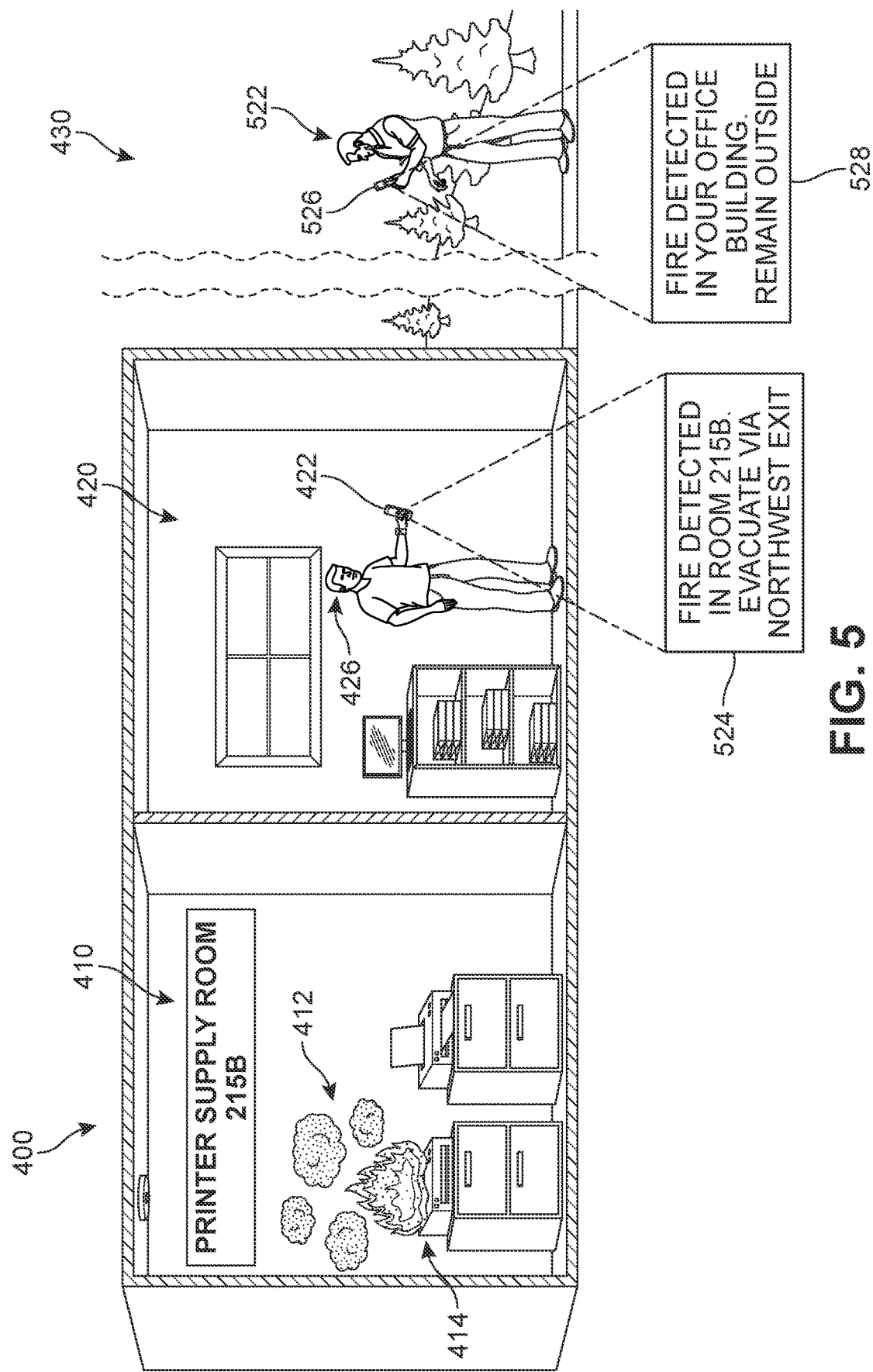
Figure 6:
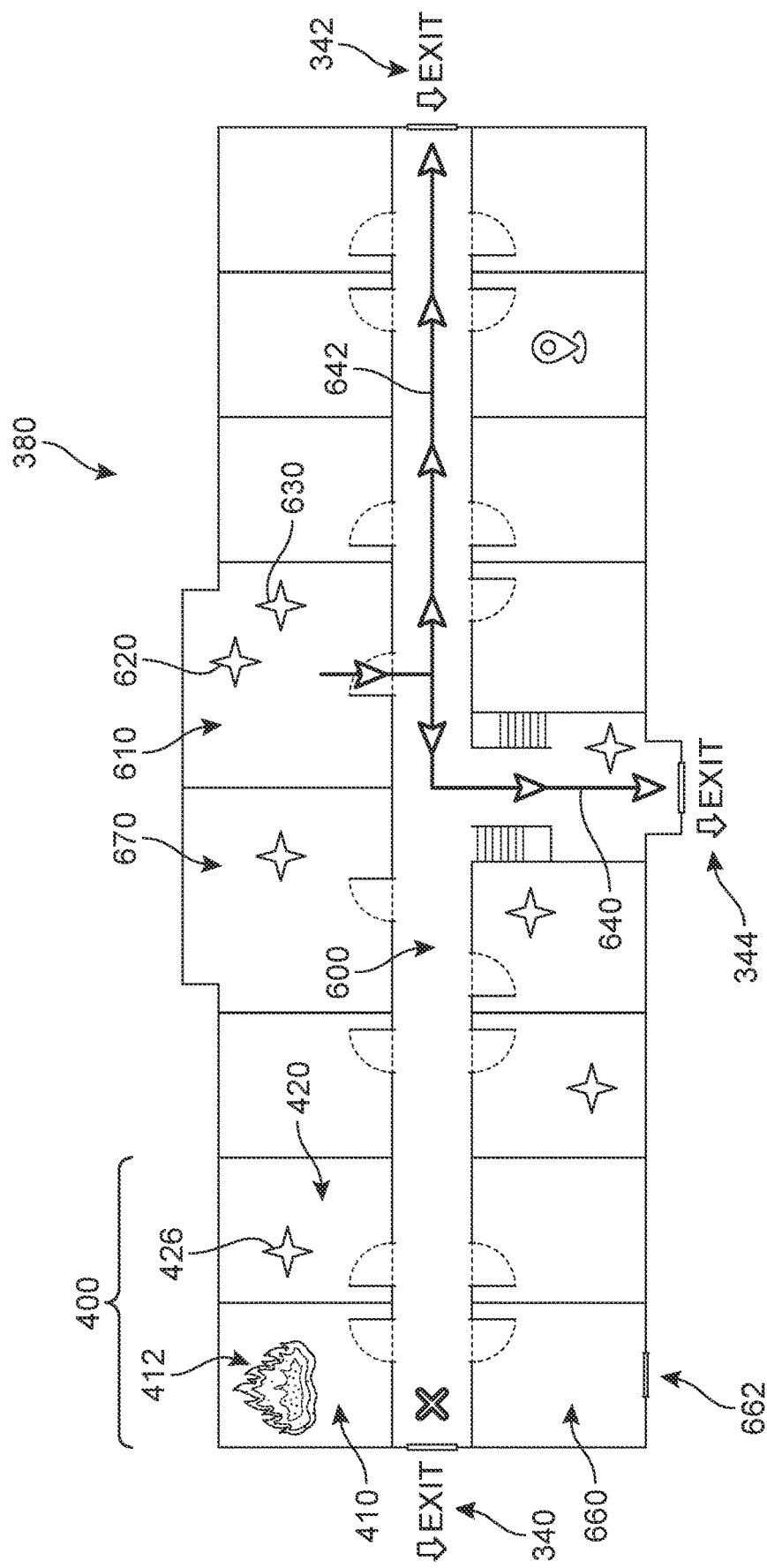
FIG. 6 is a depiction of an office space in the same building as FIGS. 4 and 5, whereby additional devices receive alerts based on the detected fire, according to an embodiment.

As noted earlier, in some cases, one or more devices may be configured to determine whether it is in a dangerous situation by contrasting normal or ambient conditions, such as temperature or the presence of smoke, with current conditions. For example, if the device network receives temperature data from a nearby temperature sensor that includes very hot temperatures, the system may infer that the environment is close to a fire and therefore that area is not a safe zone. In FIG. 5, the infrared sensor of first device 422 and/or IoT sensor 418 have received data that the system uses to determine an emergency situation is occurring and an evacuation is warranted. In this case, the system triggers a pre-selected audio and/or display alert that is presented by some or all of the devices in the device network. In different embodiments, the system can, with reference to its repository of previously stored information about structure 400 and corresponding emergency management and evacuation policies, and/or preferences of the first user 420, can automatically generate one or more navigation messages to the first user 420 via his first device 422. For example, as the fire 412 in first room 410 grows, the heat detected by the system can exceed a preestablished threshold, and the system can determine that there is a high likelihood of a fire hazard. In this case, a second alert message 524 ("Fire detected in Room 215B. Evacuate via Northwest exit.") is displayed to the first user 420, thereby directing the first user 420 toward a path away from danger and toward what appears to be a safe zone (e.g., outdoors).

Furthermore, as noted earlier, in some embodiments, the system can be configured to generate similar alerts to other persons with device(s) registered within the network. For purposes of illustration, a third user 522 standing outside in outdoor environment 430 may receive a third alert message 528 ("Fire detected in your office building. Remain outside.") via a second device 526. Thus, it can be understood that while in some embodiments the alert messages generated by devices in the device network can be identical or substantially similar, in other embodiments, the messages may be tailored toward the location and/or preferences of the specific user. In FIG. 5, because the third user 522 is located in close proximity to a building for which a fire warning has been triggered, an alert message is provided to the third user 522. In some cases, this secondary alert can be triggered by the GPS location for the second user's device. In other cases, this secondary alert can be triggered in response to a recognition by the system that, when the third user 522 previously registered his device, he indicated that his place of work was located at structure 400, or he otherwise indicated that he was a frequent visitor of structure 400. In this scenario, the third user 522 would receive an alert message informing him of the current fire detected at structure 400, regardless of second user's current location (i.e., even if he were in another entirely different building or geographical region).

For purposes of illustration, the scenario presented with reference to FIGS. 4 and 5 can be placed into the context previously described in FIG. 3B. In the example discussed in FIGS. 6 and 7, the structure 400 can be understood to represent a portion of building 380 that was introduced earlier by a schematic layout in FIG. 3B. Thus, in FIG. 6, the first room 410 and adjoining second room 420, containing second user 426, have been placed in the larger context of building 380, as shown. First room 410 is directly adjacent to the first exit 340. In this case, it can be seen that there is a plurality of devices registered within the device network and currently located throughout some of the rooms of building 380. For example, registered devices including a third device 620 and a fourth device 630 can be observed in a third room 610 located further down a hallway 600 of building 380, several rooms away from first room 410, closer to second exit 342, and closest to third exit 344.

As noted earlier, the system can be configured to provide directions to the user based on his or her detected location. In some embodiments, the system can present an image of the building 380 with one or more suggested evacuation routes. In this case, a first suggested route 640 might be displayed on the registered devices to provide safe passage or otherwise avoid the detected fire 412 by moving toward the nearest exit (third exit 344). In addition, registered device 620 can be activated to continue to assess the surrounding environment in case additional hotspots occur and the user needs to be re-routed toward a different exit or path.

Figure 7:
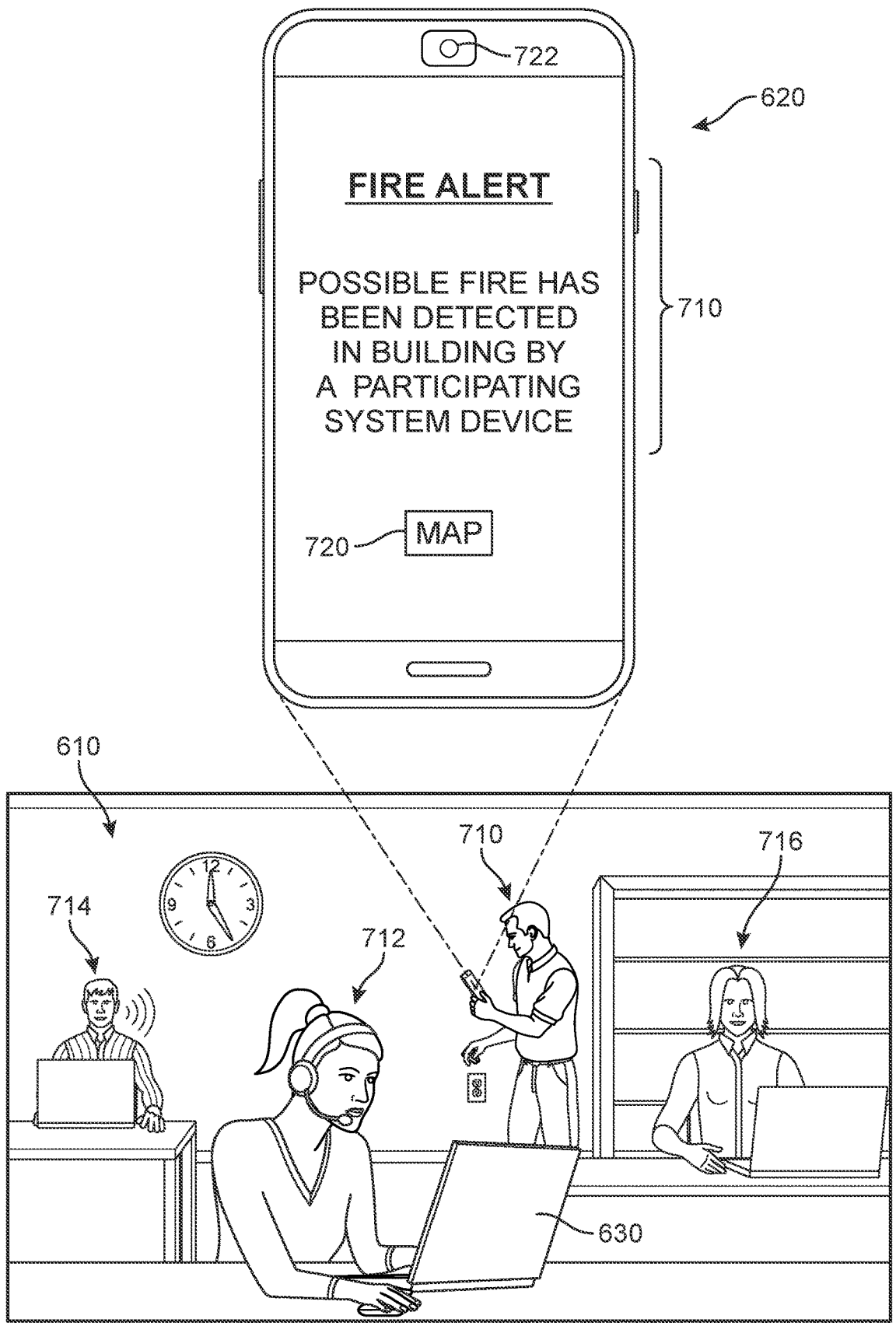
FIG. 7 is an illustration of a mapping interface in which an end-user receives a series of navigation cues directing the end-user toward an exit, according to an embodiment.

In FIG. 7, one example of the scenario occurring in third room 610 is shown. In FIG. 7, a fourth user 710 associated with the third device 620 and a fifth user 712 associated with the fourth device 630 are shown in the third room 610, along with other persons (e.g., work colleagues) without registered devices such as first occupant 714 and second occupant 716. In some embodiments, at the same time, around the same time, or very soon after the time that second user 426 receives his alert messages (see FIGS. 4 and 5), the system can be configured to initiate warnings to all devices registered to the local device network. As seen in FIG. 7, the third device 620 issues a warning message 710 with a selectable option ("MAP") 720 for viewing the suggested evacuation instructions. In some embodiments, an infrared sensor 722 of third device 620 can be activated to maintain real-time monitoring of the surrounding environment, and adjust the warning messages based on data received by infrared sensor 722. Similarly, fourth device 630 (here, a laptop computer) can be understood to also issue a warning message to fifth user 712.

In some embodiments, the remaining occupants can be alerted to the situation by their two colleagues and/or by sounds being emitted by the two registered devices in the room. In different embodiments, such audio output can be personalized and/or selected from a list of available audio types. Various types of sounds can be incorporated into the warning, and volume, speed of playback, and voice type can be adjusted to correspond to the user's preferences. The spoken words can be entered by the user or pre-selected by the system defaults. For example, spoken navigation type directions may be produced, such as "Move forward", "Go toward the stairs". The Alarm Types can be represented by different types of warning sounds (e.g., shrill whistles, ringing, beeps, chimes, tones, etc.) that can be change based on the device's proximity to the detected fire or to the nearest safe exit.

Thus, with the aid of information collected by local stationary IoT devices and/or registered mobile present in the building, the system can generate real-time, dynamic alerts and guidance to building occupants. For example, during a fire, the system could receive information from a smart smoke sensor. The system can determine which smoke sensor is nearest to the source of fire and use that information to infer that the room where that smoke detector is located must be avoided. If that room includes the primary exit, the system can move to the next listed exit. For example, if in the scenario of FIGS. 6 and 7 there was a registered device in a fourth room 660, the system could recommend that the user avoid exiting through the room door (very close to the fire 412) and instead attempt to exit via a room window 662. Similarly, if the fire was instead located in a fifth room 670 directly to the left of and adjacent to third room 610, the system can direct the user toward the second exit 342 via a second suggested route 642, rather than first suggested route 640, to better avoid the fire. If the fire was determined to have spread across the entire ground floor, the users could collectively could be directed to exit from a window, or to await emergency services. By using multiple types of information from different kinds of sources, the system may better infer the probability that a given location is safe or dangerous and redirect the user based on its pre-programmed routes and exits.

Figure 8:
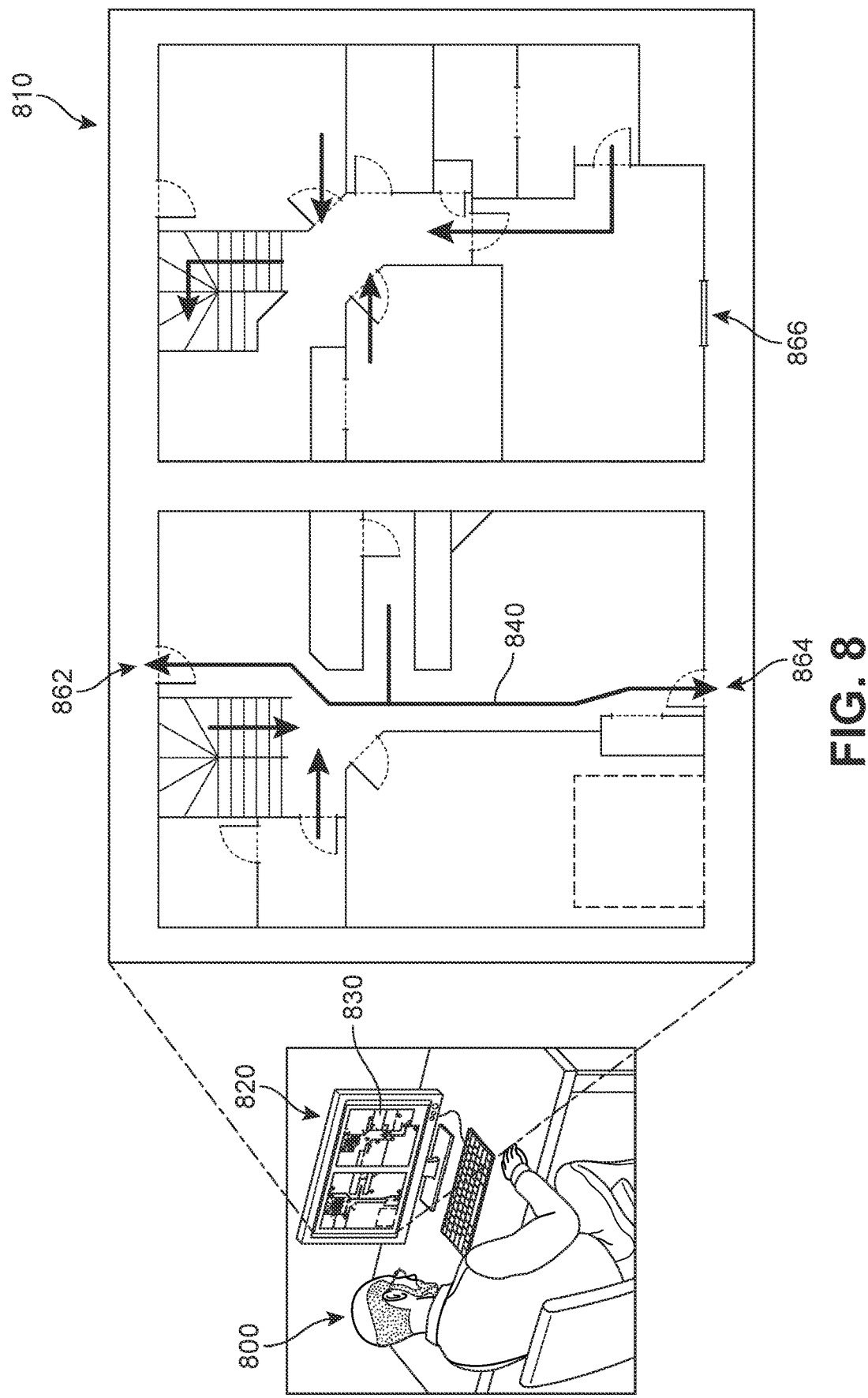
FIG. 8 is a depiction of an end-user mapping a home and designating evacuation routes and exits.

While the mapping process may occur directly on a user's mobile device, it should be understood that in other embodiments, any other client computing device can be used to access the user account and mapping interface, as illustrated in FIG. 8. For example, a building manager, homeowner, or other primary administrator ("administrator") 800 for a house 810 (shown here as a schematic layout) can register one or more devices for use by the system. In this case, the administrator 800 uploads the schematic via a desktop client device 820 and identifies each room or space in the house 810 through a system app interface 830.

Once the user has inputted data describing the arrangement of his or her home or building, this layout can be used to facilitate the evacuation strategy for the house 810. In some other embodiments, a central server or cloud-computing platform or some other device could the automatically determine the routes using uploaded maps, diagrams, architectural drawings of the building, as well as using a map generated based on positional information obtained from the devices of the device network (e.g., positional information from the devices is used to construct a map of the house), with reference to exits (i.e., a first primary exit 862 and second primary exit 864). Thus, the administrator 800 himself may identify or otherwise input the preferred exit route(s) for the house 810, as well as 'backup' exit routes that may be identified in case the preferred exit route is deemed too dangerous (e.g., a secondary exit 866 where a window is shown). In some embodiments, the administrator 800 may identify a sequence of intermediate navigation locations to take the user along a path from each possible location in the house to the nearest designated exit. For example, if the user is in an upstairs bedroom in a house and the safe zone is outside, the set of intermediate navigation locations may include a location in an upstairs hallway, a location on a staircase, and a location in a living room adjacent a front door.

In other embodiments, the mapping process can be performed in an automatic or semi-automatic fashion based on information added by the administrator 800 that allows the system to generate the most likely best route based on the start point and desired end point. The devices can, for example, generate and transmit positional information and send the location information to the central server or cloud computing platform, or to the local registered device(s). For example, as the device is being added to the network, it may prompt the user via a computing display or voice queries to confirm its location (e.g., kitchen, laundry room, hallway, etc.) using voice, touch, or button-based inputs. In some cases, the device(s) may be equipped to determine GPS coordinates, Wi-Fi location, or cellphone tower location information and transmit this information to the server to attempt to automatically construct a map of the space, which will be used to generate navigation instructions during an emergency.

Figure 9:
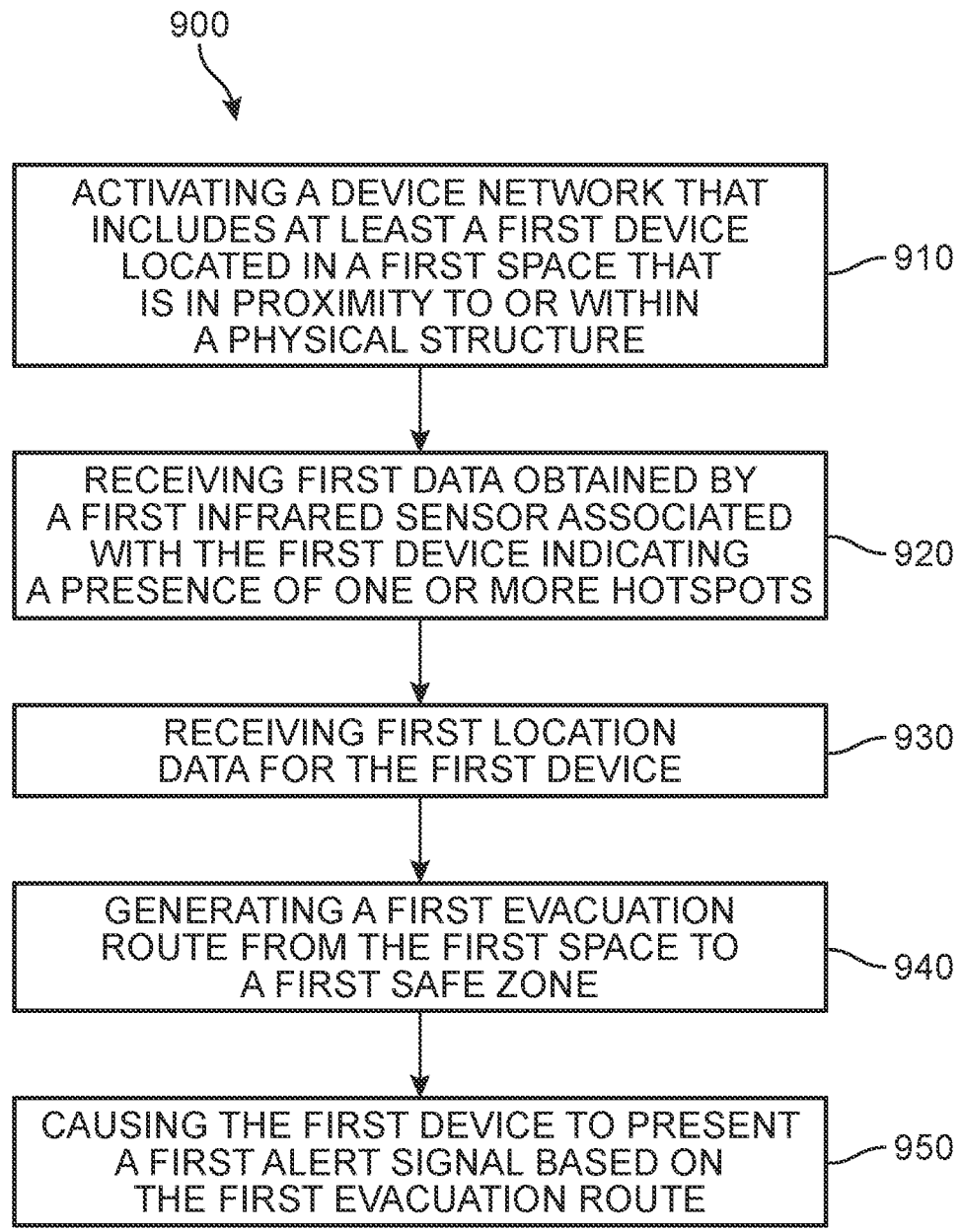
FIG. 9 is a flow diagram of a process for conveying alerts and/or navigation guidance to an end-user during an emergency situation, according to an embodiment.

FIG. 9 is a flow chart illustrating an embodiment of a method 900 for conveying alerts and navigation guidance to an end-user during an emergency situation that may be implemented via a computing device. The method 900 includes a first step 910 of activating a device network that includes at least a first device located in a first space that is in proximity to or within a physical structure. The method 900 also includes a second step 920 of receiving, from the first device, first data obtained during a first time by a first infrared sensor associated with the first device indicating a presence of one or more hotspots near the first device. A third step 930 includes receiving, from the first device, first location data for the first device, and a fourth step 940 includes generating a first evacuation route from the first space to a first safe zone based at least in part on the received first data and first location data. Finally, a fifth step 950 includes causing the first device to present a first alert signal or message based at least in part on the first evacuation route.

In other embodiments, the method may include additional steps or aspects. In one embodiment, the method also includes causing the first device to emit, as the first alert signal, an audio-based message informing the end-user about the emergency situation and directing an end-user of the first device toward the first safe zone. In another example, the method can further include causing the first device to display, as the first alert signal, a mapping interface indicating a current location of the first device and a visual path directing an end-user of the first device toward the first safe zone.

In some embodiments, the method may also include steps of receiving, via a smart IoT sensor located within the physical structure, second data of a local environmental condition that indicates a high probability of an emergency situation, and then generating the first evacuation route from the first space to the first safe zone based at least in part on the received second data. In one embodiment, the method can include steps of receiving, via a second device of the device network, second data of a local environmental condition that indicates a high probability of an emergency situation, and then generating the first evacuation route from the first space to the first safe zone based at least in part on the received second data. In some other embodiments, the method may also include steps of receiving, from the first device, second data obtained during a second time subsequent to the first time by the first infrared sensor indicating a change (i.e., an increase or decrease) in the presence or intensity of hotspots near the first device, and updating the first evacuation route based at least in part on the received second data.

In another example, the method may also include causing a second device of the device network located in a second space to present a second alert signal indicating estimated location(s) of the one or more hotspots detected by the first infrared sensor. In such cases, the method can also include steps of receiving, from the second device, second location data for the second device, generating a second evacuation route from the second space to a second safe zone based at least in part on the received first data and second location data, and causing the second device to present a map showing the second evacuation route. In another example, the method can then include causing, in response to receiving the first data, a second infrared sensor associated with the second device to search for hotspots around the second space.

In some embodiments, the method also includes steps of receiving, from the second device, second data obtained by the second infrared sensor indicating a presence of one or more hotspots near the second device, and updating the first evacuation route based at least in part on the received second data. As another example, the method can further include causing a second device of the device network to present a second alert signal indicating estimated location of the first device and a request to assist the end-user of first device.

Other methods may be contemplated within the scope of the present disclosure. For example, in some embodiments, the method can include a first step of receiving, from a first device of a device network, first data obtained during a first time by a first infrared sensor associated with the first device indicating a presence of one or more hotspots near the first device and a second step of causing the first device to emit, as a first alert signal, a message informing the end-user about the emergency situation and directing the end-user of the first device toward a first safe zone.

In some cases, the method can further comprise receiving, from the first device, first location data for the first device indicating the first device is at a first position, and then generating a first evacuation route from the first position to a first safe zone based at least in part on the received first data and first location data. In another example, the method may also include causing a second device of the device network located at a second position to present a second alert signal indicating estimated location(s) of the one or more hotspots detected by the first infrared sensor. In such cases, the method may also include steps of receiving, from the second device, second location data for the second device, generating a second evacuation route from the second position to a second safe zone based at least in part on the received first data and second location data, and then causing the second device to present a map showing the second evacuation route. In some embodiments, the method can further include causing, in response to receiving the first data, a second infrared sensor associated with the second device to search for hotspots around the second position.

As another example, the method may include steps of receiving, from the second device, second data obtained by the second infrared sensor indicating a presence of one or more hotspots near the second device, and then updating the first evacuation route based at least in part on the received second data. In some other embodiments, the method can further include steps receiving, from the first device, second data obtained during a second time subsequent to the first time by the first infrared sensor indicating a decrease in the presence or intensity of hotspots near the first device, and updating the first evacuation route based at least in part on the received second data.

As described herein, the proposed systems and methods offer users who are in an area or building where there is a fire to be alerted in real-time. The system also allows users to detect hotspots using infrared sensors and provide guidance on avoiding the hotspots and making their way to a safe zone. The system can use the infrared sensors of multiple enrolled devices to determine the locations of hotspots and associate those to a map of the building. The system can incorporate the data received across this device network to route the users along a safe path.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method for alerting and guiding end-users during an emergency situation, the method comprising:
receiving, from a first device located in a first space, first data obtained during a first time indicating a presence of one or more hotspots near the first device;
receiving, from the first device, first location data for the first device;
generating a first evacuation route from the first space to a first safe zone based at least in part on the received first data and first location data;
receiving, from the first device, second data obtained during a second time subsequent to the first time by the first device indicating a change in the presence or intensity of hotspots near the first device; and
updating the first evacuation route based at least in part on the received second data.

2. The method of claim 1, further comprising causing the first device to emit an audio-based message informing the end-user about the emergency situation and directing the end-user of the first device toward the first safe zone.

3. The method of claim 1, further comprising causing the first device to display a mapping interface indicating a current location of the first device and a visual path directing the end-user of the first device toward the first safe zone.

4. The method of claim 1, further comprising:
receiving, via a smart IoT sensor located near the first safe zone, third data of a local environmental condition that indicates a high probability of an emergency situation; and
generating the first evacuation route from the first space to the first safe zone based at least in part on the received third data.

5. The method of claim 1, further comprising:
receiving, via an infrared sensor near the first space, third data of a local environmental condition that indicates a high probability of an emergency situation; and
generating the first evacuation route from the first space to the first safe zone based at least in part on the received third data.

6. The method of claim 1, further comprising:
receiving, from the first device, third data obtained during a third time subsequent to the second time by the first device indicating a decrease in the presence or intensity of hotspots near the first device; and
updating the first evacuation route based at least in part on the received third data.

7. A method for alerting and guiding end-users during an emergency situation, the method comprising:
receiving, from a first device, first data obtained during a first time indicating a presence of one or more hotspots near the first device;
causing the first device to emit, as a first alert signal, a message directing the end-user of the first device toward a first safe zone via a first evacuation route;
receiving, from the first device, second data obtained by the first device during a second time subsequent to the first time indicating a change in the presence or intensity of hotspots near the first device; and
updating the first evacuation route based at least in part on the received second data.

8. The method of claim 7, further comprising:
receiving, from the first device, first location data for the first device indicating the first device is at a first position;
generating the first evacuation route from the first position to a first safe zone based at least in part on the received first data and first location data.

9. The method of claim 8, further comprising causing a second device at a second position to present a second alert signal indicating estimated location(s) of the one or more hotspots detected by the first device.

10. The method of claim 9, further comprising:
receiving, from the second device, second location data for the second device;
generating a second evacuation route from the second position to a second safe zone based at least in part on the received first data and second location data; and
causing the second device to present a map showing the second evacuation route.

11. The method of claim 9, further comprising causing, in response to receiving the first data, the second device to search for hotspots around the second position.

12. The method of claim 7, further comprising:
receiving, from a second device, third data indicating a presence of one or more hotspots near the second device; and
updating the first evacuation route based at least in part on the received third data.

13. The method of claim 7, further comprising:
receiving, from the first device, third data obtained during a third time subsequent to the second time indicating an increase in the presence or intensity of hotspots near the first device; and
updating the first evacuation route based at least in part on the received third data.

14. A system for alerting and guiding end-users during an emergency situation, the system comprising a processor and machine-readable media including instructions which, when executed by the processor, cause the processor to:
receive, from a first device located in a first space, first data obtained during a first time indicating a presence of one or more hotspots near the first device;
receive, from the first device, first location data for the first device;
receive, from a second device located in a second space, second data of a local environmental condition that indicates a high probability of an emergency situation; and
generate a first evacuation route from the first space to a first safe zone based at least in part on the received first data, first location data, and second data.

15. The system of claim 14, wherein the instructions further cause the processor to cause the first device to present a first alert signal based at least in part on the first evacuation route.

16. The system of claim 14, wherein the instructions further cause the processor to cause the second device to present a second alert signal indicating estimated location(s) of the one or more hotspots detected by the first device.

17. The system of claim 14, wherein the instructions further cause the processor to:
receive, from the second device, second location data for the second device;
generate a second evacuation route from the second space to a second safe zone based at least in part on the received second data and the second location data; and
cause the second device to present a map showing the second evacuation route.

18. The system of claim 14, wherein the instructions further cause the processor to cause, in response to receiving the first data, the second device to search for hotspots around the second space.

19. The system of claim 14, wherein the instructions further cause the processor to:
receive, from the second device, third data indicating a presence of one or more hotspots near the second device; and
update the first evacuation route based at least in part on the received third data.

20. The system of claim 14, wherein the instructions further cause the processor to cause a third device to present a second alert signal indicating an estimated location of the first device and a request to assist the end-user of first device.

* * * * *